United States Patent
McGovern

(10) Patent No.: US 12,541,776 B1
(45) Date of Patent: Feb. 3, 2026

(54) THREE-WAY EXCHANGE SYSTEM FOR RAISING FUNDS FOR PROJECTS

(71) Applicant: Paul McGovern, Oregon House, CA (US)

(72) Inventor: Paul McGovern, Oregon House, CA (US)

( * ) Notice: Subject to any disclaimer, the term of this patent is extended or adjusted under 35 U.S.C. 154(b) by 830 days.

(21) Appl. No.: 17/543,683

(22) Filed: Dec. 6, 2021

Related U.S. Application Data

(63) Continuation-in-part of application No. 16/600,497, filed on Oct. 12, 2019, now Pat. No. 11,195,150.

(60) Provisional application No. 62/746,508, filed on Oct. 16, 2018.

(51) Int. Cl.

| | |
|---|---|
| *G06Q 10/10* | (2023.01) |
| *G06Q 10/06* | (2023.01) |
| *G06Q 30/02* | (2023.01) |
| *G06Q 30/0279* | (2023.01) |
| *G06Q 30/06* | (2023.01) |
| *G06Q 50/00* | (2012.01) |
| *G06Q 20/10* | (2012.01) |

(52) U.S. Cl.
CPC ....... *G06Q 30/0279* (2013.01); *G06Q 10/103* (2013.01); *G06Q 50/01* (2013.01); *G06Q 20/10* (2013.01)

(58) Field of Classification Search
CPC .. G06Q 30/0279; G06Q 10/103; G06Q 50/01; G06Q 20/10
USPC .................................................. 705/1.1–912
See application file for complete search history.

(56) References Cited

U.S. PATENT DOCUMENTS

| | | | | |
|---|---|---|---|---|
| 2005/0144120 A1* | 6/2005 | Flake | ..................... | G06Q 20/10 705/39 |
| 2013/0204801 A1* | 8/2013 | Downs | ............... | G06Q 30/0279 705/329 |
| 2015/0051995 A1* | 2/2015 | Courtney | ........... | G06Q 30/0601 705/26.1 |
| 2017/0109800 A1* | 4/2017 | Heitmann | .......... | G06Q 30/0279 |

* cited by examiner

*Primary Examiner* — Jonathan P Ouellette
(74) *Attorney, Agent, or Firm* — Chad Peterson

(57) ABSTRACT

Methods, systems, and apparatuses, including computer programs encoded on computer storage media, are provided for managing contributions to projects via a three-way exchange platform. A project manager uploads project details, which are stored on the platform. A provider uploads details of one or more services, classes, events, products, or experiences offered by the provider, which are stored and published on the platform. The provider also indicates support for the project. A shopper who wants to use the provider's service, purchase the provider's product, or participate in the provider's class, event, or experience, hires the provider or purchases access to the class, event, or experience. Part or all of the money paid to the provider is added to an account associated with the project. Communications with the three-way exchange platform may be enabled by an application programming interface.

20 Claims, 15 Drawing Sheets

THREE-WAY EXCHANGE SYSTEM FOR RAISING FUNDS FOR PROJECTS

CROSS-REFERENCE TO RELATED APPLICATIONS

The present application claims priority to U.S. patent application Ser. No. 16/600,497, entitled "THREE-WAY EXCHANGE SYSTEM FOR RAISING FUNDS FOR PROJECTS," filed Oct. 12, 2019, and claims the benefit of U.S. Provisional Patent Application No. 62/746,508, entitled "SYSTEMS AND METHODS FOR RAISING FUNDS FOR PROJECTS," filed Oct. 16, 2018, each of which is incorporated by reference herein in its entirety.

BACKGROUND

Crowdfunding is the practice of raising funds for a venture, application, or other project by soliciting and receiving contributions from a large number of people, typically via the internet. There are generally three types of entities involved in a crowdfunding project, a project manager who initiates the crowdfunding project and creates the project description on the crowdfunding service; individuals or groups who contribute money to the project; and the crowdfunding service that brings the other parties together. One example of a crowdfunding system is kickstarter.com. However, current crowdfunding systems are limited to accepting monetary contributions, and are not capable of accepting donations of time.

In addition, certain systems allow for individuals or groups with skills helpful to the completion of a project to contribute those skills to the project. However, individuals and groups without the required skills are unable to contribute their time to the project, even when they want to support the project in a non-financial manner.

Therefore, it would be advantageous if there was a platform that allowed individuals or groups that wanted to support a crowdfunding project by donating their time, rather than their money, could do so. It would be further advantageous if such a system allowed the donations of time even when the supporting individuals or groups do not have the skills necessary to directly participate in the completion of the project.

SUMMARY

In accordance with the foregoing objectives and others, exemplary methods and systems are disclosed herein to enable the crowdfunding of projects via a three-way exchange platform, bringing together project managers, shoppers, and providers to fund the projects. In general, project managers post projects to the system, including information about the project. Afterwards, entities who would like to support a particular project (also known herein as "providers") post services that they are able to provide, classes, events, or experiences that they can hold, and/or products they can provide (including digital assets such as non-fungible tokens (NFTs)), and select the particular projects (or types of projects) that they are interested in supporting. Services, classes, events, experiences, and products can be provided in the real word, online, or in a virtual world.

Then other entities that need the services, classes, events, products, or experiences provided by the providers (also known herein as "shoppers") hire the providers to perform the offered services or pay for the offered classes, events, products, or experiences. After the provider completes the service or experience, provides the product, or the class or event is finished, the shopper funds the project instead of paying the provider for the work performed or product delivered. In an embodiment, the provider may be paid a portion of the total amount with the remainder of the funds going toward the project. In an embodiment, or for certain types of services, the transfer of funds may occur prior to the provision of services. Unlike conventional crowdfunding systems, the disclosed 3-way exchange platform allow for individuals to contribute to a project by donating their time or products, even when their skills aren't a direct match for the skills required to complete the project.

In some embodiments, shoppers can post requests for services they need performed, and providers can respond to the service requests using, e.g., bids. After the service is performed, the requesting shopper funds a project supported by the provider instead of (or in addition to) paying the provider for the service.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

The systems and methods of the present disclosure provide a 3-way exchange platform for crowdfunding projects that can be funded by a combination of monetary and product contributions and donations of time.

As used herein, "project" refers to the projects posted by project managers, who are looking for funding from other members of the crowdfunding community, e.g., shoppers. The project manager is responsible for defining and posting the project on the system and, after the project has been funded, staffing and completing the project with the provided funding.

Providers include individuals and organizations with specific skills or products they want to offer on the crowdfunding system for the purpose of supporting one or more projects, e.g., a local or cause-based project. Such skills may include providing services, holding or teaching classes, providing experiences, and/or hosting events. In general, providers want to donate some or all of their time to support one or more specific projects (or project categories) listed on the crowdfunding system. Providers include service providers, class instructors, event organizers, and experience and product providers.

Shoppers include individuals and organizations that need certain services performed by providers, classes taught by providers, product provided by providers, or events or experiences put on by providers. Some shoppers may also want to lend their support to one or more specific projects, e.g., a local or cause-based project, or project categories, listed on the crowdfunding system. As used herein, services include classes taught by providers, events organized by providers, and experiences offered by providers.

Figure 1:
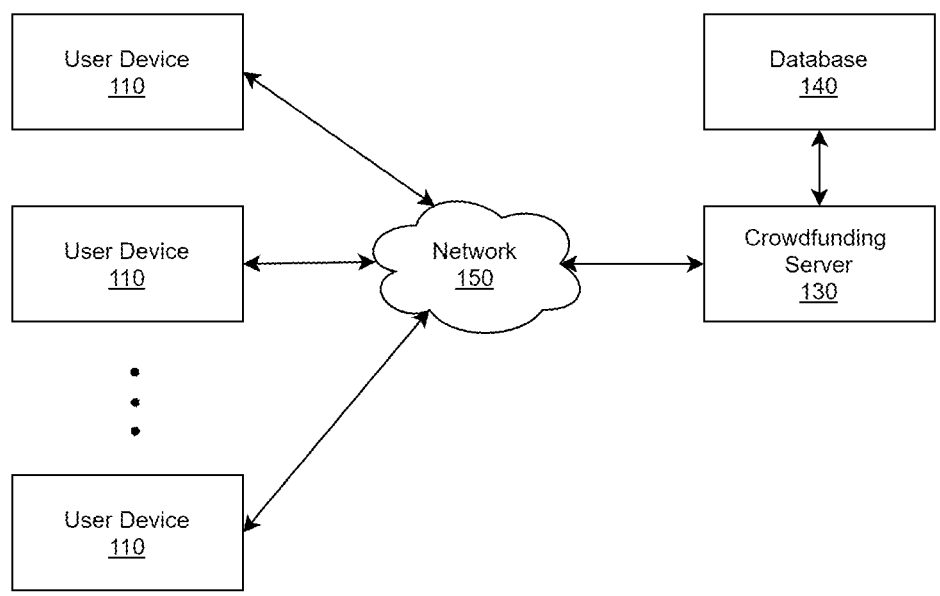
FIG. 1 shows one embodiment of a system according to one aspect of the present disclosure.

Referring to FIG. 1, a block diagram of an exemplary crowdfunding system is illustrated. The crowdfunding system may include user devices 110 and one or more crowdfunding servers 130. The user devices and crowdfunding server(s) may be remote from each other and interact through a communication network 150. Non-limiting examples of communication networks include local area networks (LANs), wide area networks (WANs) (e.g., the Internet), etc.

The crowdfunding server 130 is adapted to receive, determine, store, and/or transmit user information for any number of users (e.g., project managers, shoppers, providers, etc.). Such information may be manually entered or selected by a user via an online, mobile, or desktop application. The crowdfunding system may store received or determined user information in, for example, a database 140.

The crowdfunding server 130 may also be adapted to receive, determine, store, and/or transmit information regarding projects, services, products, and/or service requests, posted by project managers, providers, and/or shoppers. Such information may be manually entered or selected by a user via an online, mobile, or desktop application. The crowdfunding server may store received or determined information in, for example, a database 140.

In certain embodiments, a user may access the crowdfunding server 130 via a user device 110 connected to the network 150. A user device 110 may be any computer device capable of accessing the crowdfunding server 130, such as by running a client application or other software, like a web browser, web-browser-like application, mobile app, etc. User devices include, but are not limited to, mobile telephones, desktop computers, laptop computers, smart phones, tablets, etc. Generally, the client application will provide appropriate functionality (as described herein) for each type of user, so project managers, shoppers, and providers may each access the crowdfunding server 130 via a similarly-configured user device 110.

The client application may be adapted to present various user interfaces to users. Such user interfaces may be based on information sent by the crowdfunding server 130, and may allow the user to send and receive data. Each client application may comprise HTML data, images, videos, icons, and/or executable code. The executable code may be composed in JavaScript, ECMAscript, coffeescript, python, Ruby or any other programming languages suitable for execution within the client application, or translation into a client application executable form. In one embodiment, the crowdfunding server 130 may provide for each of project managers, shoppers, and providers a specific interface.

In selected embodiments, each user (e.g., project manager, provider, or shopper) may be required to register an account on the crowdfunding system. Users may be required input user information, e.g., user identification information (e.g., name, screen name, image, bio, etc.); user authentication information (e.g., account name, password, third-party authentication information (e.g., OAuth, Google Sign-In, Security Assertion Markup Language (SAML) Single-Sign On (SSO))); and/or contact information (e.g., email address, mailing address and/or other location information (e.g., zip code), phone number, etc.). Users may also be required to input financial account information if they want to fund projects and/or receive payment for services performed or products provided for shoppers.

To collect information from the user, the system may provide the user with a webpage or other interface containing text and numerical fields for the user to fill in. Entered user information will be stored by the crowdfunding server 130 in the database 140.

In one embodiment, the database 140 may also store a type associated with each user, e.g., shopper, provider, or project manager. In one embodiment, each user may be assigned any combination of available types, for example if the same individual manages one or more projects, is a shopper for one or more additional projects, and contributes his or her time to other projects as a provider.

In one embodiment, any user may post projects, service offerings, product offerings, or service requests, making a type field unnecessary.

The crowdfunding system may also store information about organizations, e.g., umbrella organizations that support the project manager. Each project manager may be connected to such an organization in the crowdfunding system. The stored organization information may include, e.g., name, description, contact information, geographical location, etc., and may be displayed to users viewing information about a project. The connection to an umbrella organization may increase user trust in the project manager's ability to complete the project.

Once registered, a user may post projects, service offerings, product offerings, and/or service requests. Users may also search for projects, service offerings, and/or service requests. For example, providers and/or shoppers may search for projects they would like to support. The client application is configured to allow shoppers and providers to select projects and/or categories of projects that they are interested in supporting. The selected project and/or project categories are stored in the database 140.

The client application is configured to allow a project manager to send information regarding a project to the crowdfunding server 130 via the network 150. The project manager may be an individual or representative of an organization (e.g., non-profit organization, a small business, etc.). The project information may include details of the project, such as the project name, description (including how the raised funds will be used), project categories, location, project completion date (e.g., deadline by when the project needs to be completed), the amount of time needed to complete the project, fundraising goals (monetary amount and timeline by when the specified amount is needed), the organization supporting the project, etc.

After the project information is received by the crowdfunding server 130, it may be reviewed to determine if it meets certain requirements of the system. For example, the system may require that a project fundraising goal not exceed a threshold amount, that the project deadline is not too soon or too far in the future, that the project is consistent with the goals of the crowdfunding system, etc. If it is determined that the project meets the requirements, the project may then be published, e.g., on a website controlled by the crowdfunding system. The project information is also stored in the database 140. Other members of the crowdfunding community (e.g., shoppers and providers) are then able to view the project and select it as a project they want to support.

In some embodiments, after the project is posted, providers and/or shoppers that have previously indicated that they support projects in the project category of the new project are notified of the new project, and given the option to select the new project as a supported project. In addition, users may be notified of the new project based on the users' history of interaction with the system. For example, a provider that has previously supported projects with a similar description as the new project may be automatically informed of the new project. One or more machine learning and/or natural language processing techniques (e.g., naïve Bayes classifiers, artificial neural networks, support vector machines, latent semantic indexing, etc.) may be used to make these automatic project suggestions. Such techniques may also be used to suggest services, providers, project managers, organizations, causes, etc., that may of interest to any user based on prior searches, support, or other transactions with the system.

The client application is also configured to allow providers to post product offerings and service offerings describing the types of services they can provide to shoppers. Service offerings include any type of service, including the use of property or other assets. Information regarding the service offerings may include a service description, a service category, the type of billing (e.g., hourly rate, fixed price, etc.), the rate (for hourly services) or the fixed amount (for fixed price services), the experience of the provider with respect to the offered service, the provider's availability, the provider's credentials, etc.

Similarly, the client application is configured to allow the posting of products, classes, events, and experiences. Information about a class may include a class description, the class location (including whether the class is online or offline), a category, the cost of the class, the experience of the provider with respect to the class, the schedule of the class (e.g., date(s) and time(s)), maximum class size, etc.

Information about an event may include an event description; a category; the cost of an event ticket; maximum number of tickets to be sold; event speakers, presenters, headliners, VIPs, and/or guests of honor; the date and time of the event; event organizer; other attendees; etc. Information about an experience may include a description; a category; the cost of the experience; the qualifications of the experience provider; the potential date(s) and time(s) when the experience can be scheduled; experience duration, etc.

Information regarding product offerings may include a product description, a product category, the cost of the product, etc. Products may be real or virtual, include non-fungible tokens (NFTs).

After a service, class, event, product, or experience is posted, it is stored in the database 140, and other users, e.g., shoppers, can search for and/or browse the offerings. If browsing services, the system will also display the projects and/or project categories that the providers support. If browsing classes, events, or experience, the system will also display the projects and/or project categories that will be supported when the shoppers pay to attend.

In one embodiment, shoppers may be notified of a new service, class, event, product, or experience based on the shopper's history of interaction with the system. For example, a shopper that has previously hired providers offering a class with a similar description as the new class offering may be automatically informed of the new class offering. One or more machine learning and/or natural language processing techniques (e.g., naïve Bayes classifiers, artificial neural networks, support vector machines, latent semantic indexing, etc.) may be used to make these automatic suggestions.

After browsing the available services, classes, products, events, and/or experiences, a shopper may hire a provider, sign up for a class, event, or experience, or purchase a product through the crowdfunding system. During this process, the shopper and provider agree on the project that will be supported by the provider's services. For example, if the provider has selected several supported projects, the shopper may identify a particular one of the projects to support. If the provider supports multiple projects, the shopper may be prompted to select from among the projects supported by the provider. If the provider has not selected a supported project, the shopper may be prompted to select a project to support.

When the service, product, class, event, or experience is completed and/or paid for by the shopper, the system transfers the agreed-upon contribution from the shopper to an account associated with the project, e.g., the account of the project manager. For example, after a service is completed by a provider, the shopper and/or the provider notifies the system of the completion of the service, and the system transfers the contracted contribution from the shopper to the account of the project manager. If the parties agreed for the provider to receive part of the payment, the system also makes the necessary transaction.

In an alternative embodiment, the client application is configured to allow shoppers to post requests for services that the shoppers need performed, and for providers to view and bid on or otherwise respond to the posted requests. A service request may include a description of the service, type of billing (e.g., hourly rate, fixed fee, etc.), a range of desired rates (for hourly services) or fixed amounts (for fixed price services), necessary expertise and/or credentials for the provider, etc. After the service request is posted to the crowdfunding system, providers can search for and bid on or otherwise respond to the service request.

In some embodiments, a shopper may specify supported projects and/or project categories (i.e., projects/project categories the shopper supports), and providers can view the projects and/or categories supported by the shopper, and may take that into consideration when bidding on or responding to service requests. In general, though, shoppers are more likely to have service requests met if the project being supported is selected by the provider.

The client application is further configured to allow shoppers to select a bid (or other response) and hire the selected provider. During the hiring process, the shopper and provider agree on the project that will be supported by the provider's service. For example, if the provider supports several projects with the same service, the shopper may identify a specific project to support when agreeing on a transaction with the provider for the service. If the provider has not selected any projects supported by the service, the shopper may be prompted to select a project to support.

As above, after the service is completed by the provider, the system transfers the contracted contribution from the shopper to one or more accounts related to the selected project and/or the provider.

Figure 2:
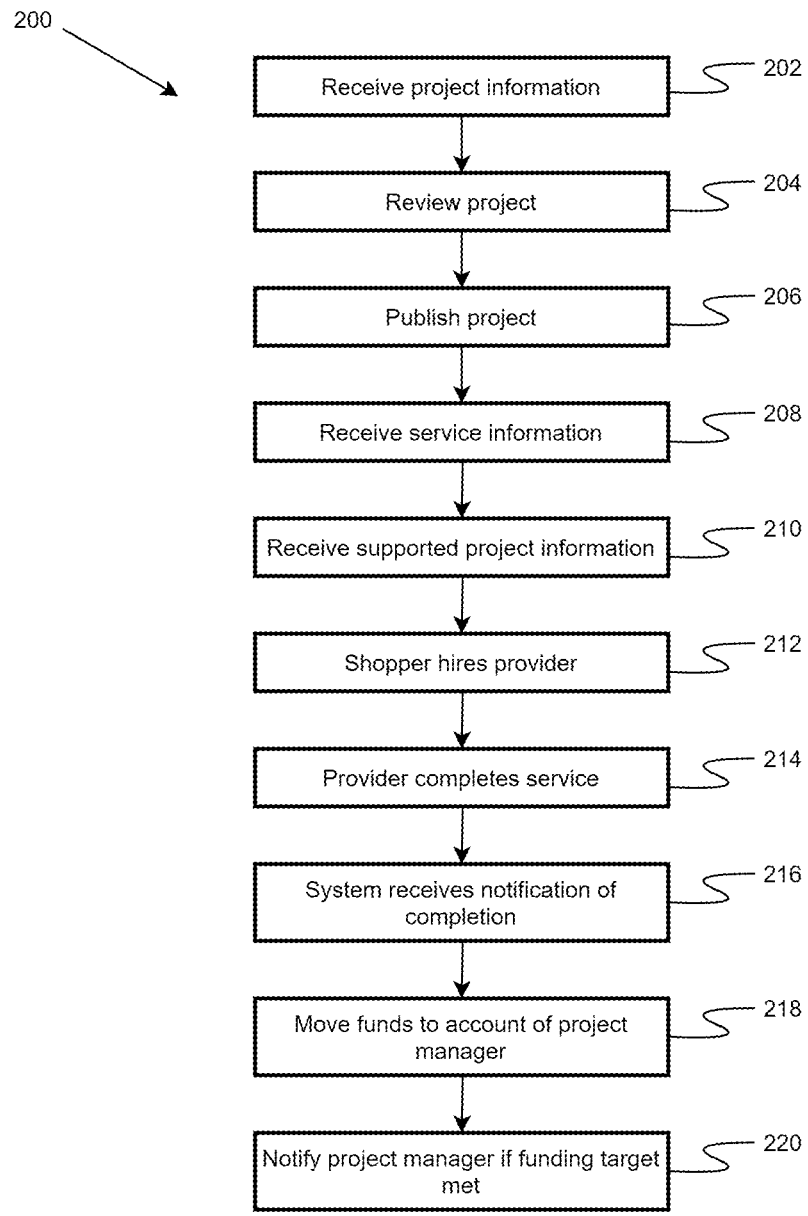
FIG. 2 shows an embodiment of a method for making a contribution to a project according to one aspect of the present disclosure.

FIG. 2 is a flow chart illustrating a method 200 for making a contribution to a project according to one example. At step 202, the crowdfunding server 130 receives information regarding a project, e.g., from a project manager, via the network 150. Such information may include, e.g., the project name, description (including how the raised funds will be used), project categories, location, project completion date (e.g., deadline by when the project needs to be completed), the amount of time needed to complete the project, fundraising goals (monetary amount and timeline by when the specified amount is needed), the organization supporting the project, etc.

At step 204, the project information may be reviewed to determine if it meets the requirements of the crowdfunding system.

Figure 4:
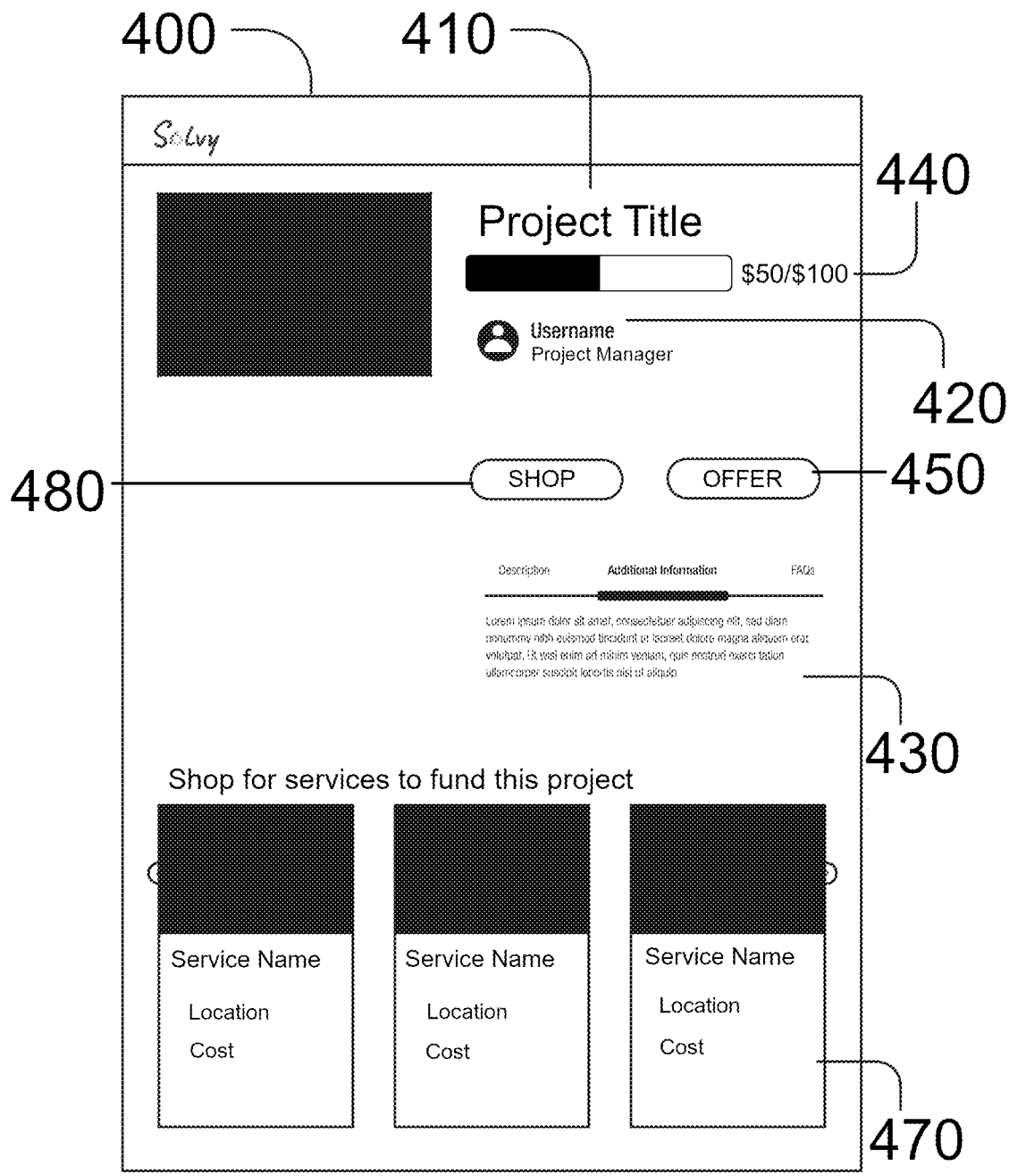
FIG. 4 shows an embodiment of a project information screen according to one aspect of the present disclosure.

At step 206, the project is published to the crowdfunding system. The project may be published online through a website hosted on the crowdfunding server 130. The website may alternatively be hosted by a third party provider. FIG. 4 shows an example project information screen 400, showing the details regarding a project. FIG. 4 includes the project title 410, the project manager 420, the project description 430, the funding amount needed and the current total funds raised 440, and list of recent supporters of the project, which can be selected to show a full list of project supporters.

The project information screen also includes several interface elements to allow users to support a project. For example, shoppers can review the services offered by providers in support of the project at available services section 470. In one embodiment, shop services button 480 links to this section. By selecting offer services button 450, providers can indicate that they want to support the project with their services, and they will then be listed in available services section 470.

Figure 5:
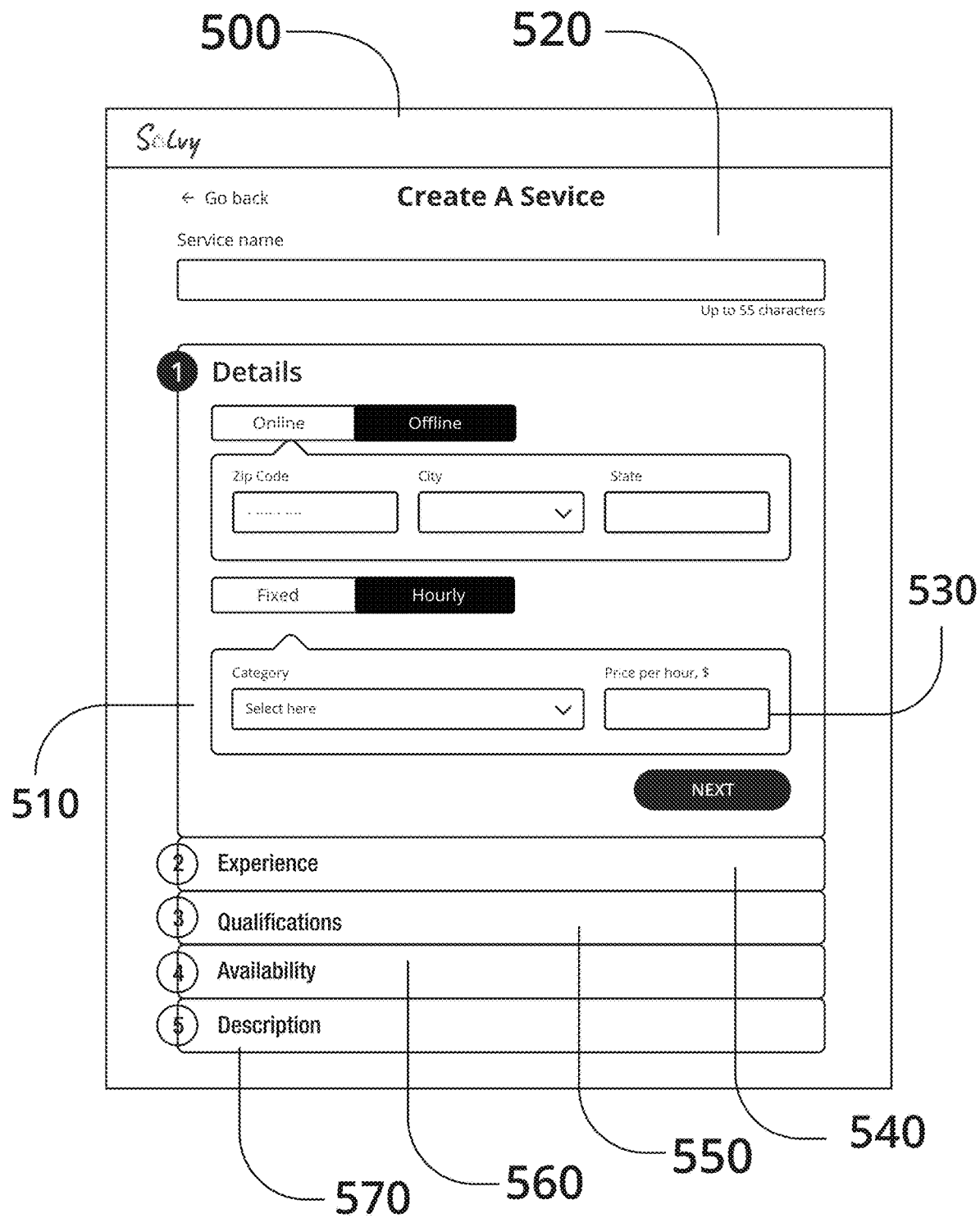
FIG. 5 shows an embodiment of a service information input screen according to one aspect of the present disclosure.

At step 208, the crowdfunding server 130 receives information regarding a service offering of a provider. In one embodiment, the provider may use an online form, e.g. service information input screen 500 shown in FIG. 5, to provide the information regarding the service offering. Such information may include the service category 510, service name 520, cost information 530, experience level of the provider 540 (e.g., number of years of experience), provider qualifications 550 (e.g., applicable industry certifications), provider availability 560 (e.g., how much time the provider is able to contribute), and service description 570.

Figure 6:
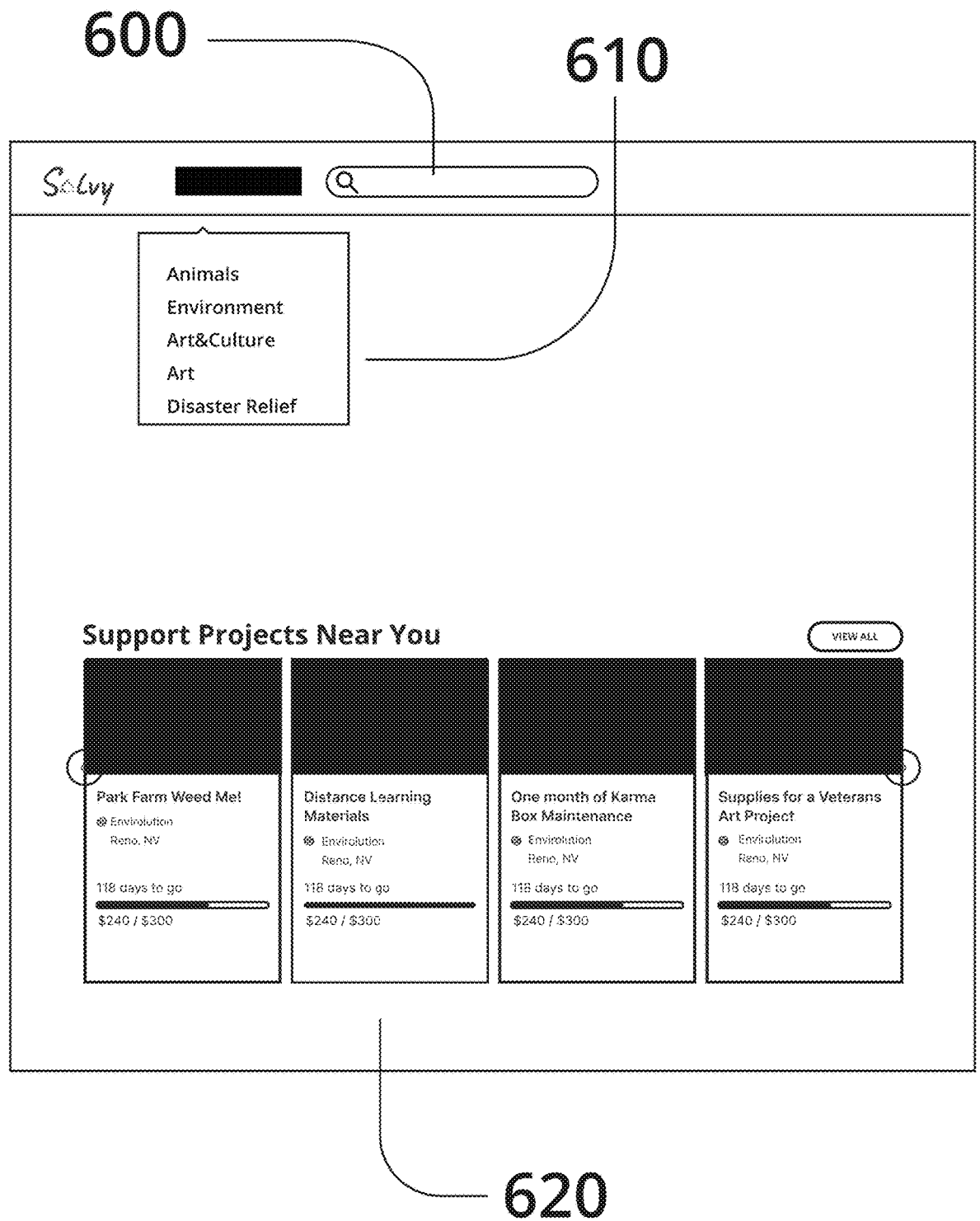
FIG. 6 shows an embodiment of a project search screen according to one aspect of the present disclosure.

At step 210, the crowdfunding server 130 receives information regarding one or more projects and/or categories of projects supported by the provider. In one embodiment, the provider may view a project search screen that shows available projects to support and allows the provider to search for projects. An example project search screen 600 is illustrated in FIG. 6, and includes a project category selection section 610, and a project display section 620.

After selecting a particular project, the provider may indicate support for a project by clicking a link (e.g., support project button 450) on a project information screen (e.g., project information screen 400 in FIG. 4). In an embodiment, the provider may select a different set of (i.e., one or more) supported projects for each service provided by the provider.

At step 212, a shopper having a need for the service offered by the provider views the service offering and hires the provider. During the hiring process, the project that will be supported is determined.

Figure 7:
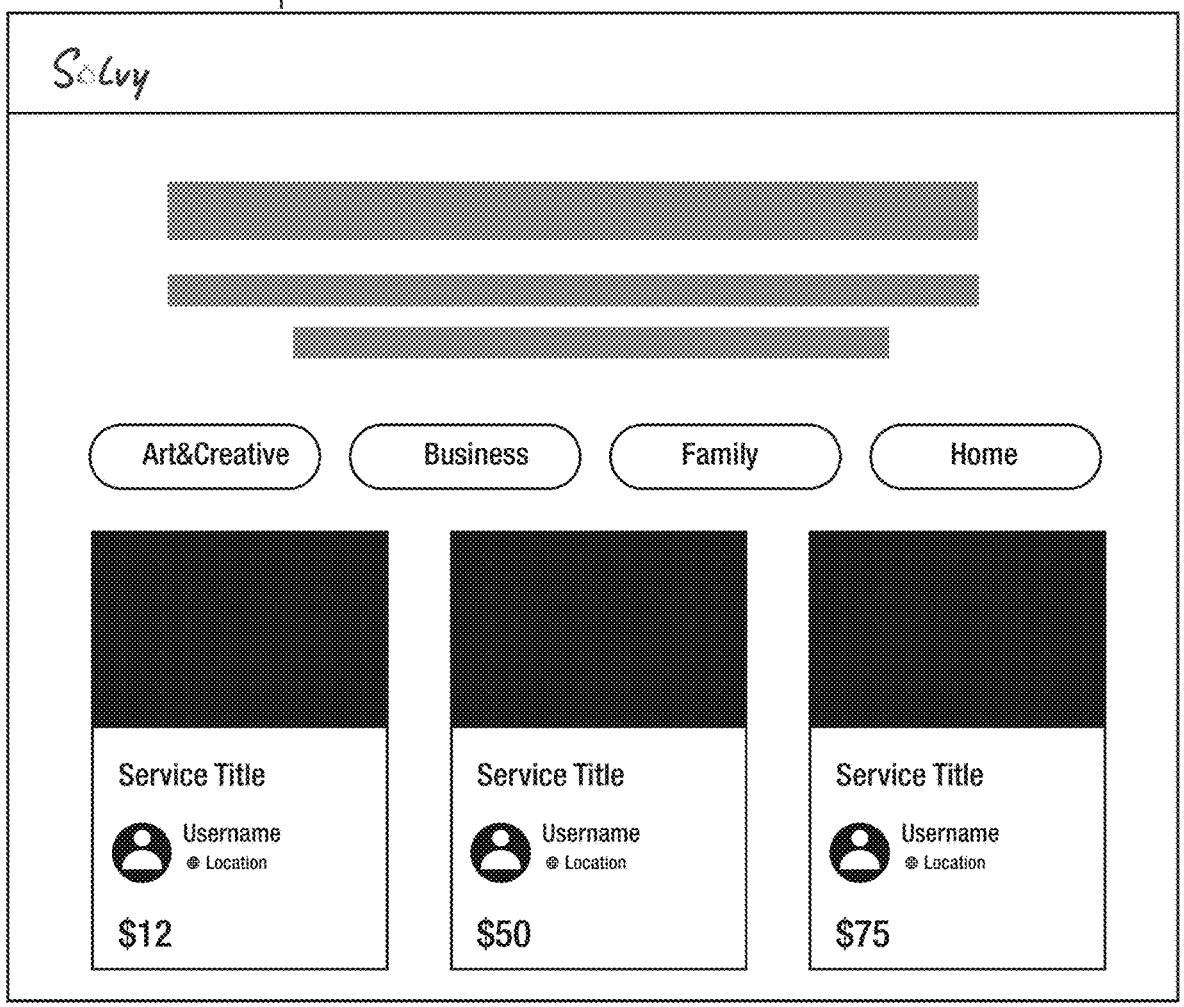
FIG. 7 shows an embodiment of a services screen according to one aspect of the present disclosure.

For example, the shopper may view available services on a services screen 700, as illustrated in FIG. 7, and select a desired service. Alternatively, the shopper may search for a project (as described above with respect to step 210) and select a project from the project search screen. After selecting a project, the shopper may select from among the services provided by the providers supporting the project.

In one embodiment, the provider and/or the shopper may unilaterally select the project that will be supported. In one embodiment, providers may select a different set of supported projects for each service offered.

In one embodiment, the shopper may select from among the projects supported by the provider. For example, FIG. 8 shows a provider hiring screen 800 that may be displayed to a user after a particular service has been selected, whether by searching for services specifically or by selecting from among services offered by providers supporting a particular project.

Figure 8:
FIG. 8 shows an embodiment of a provider hiring screen according to one aspect of the present disclosure.
Figure 9:
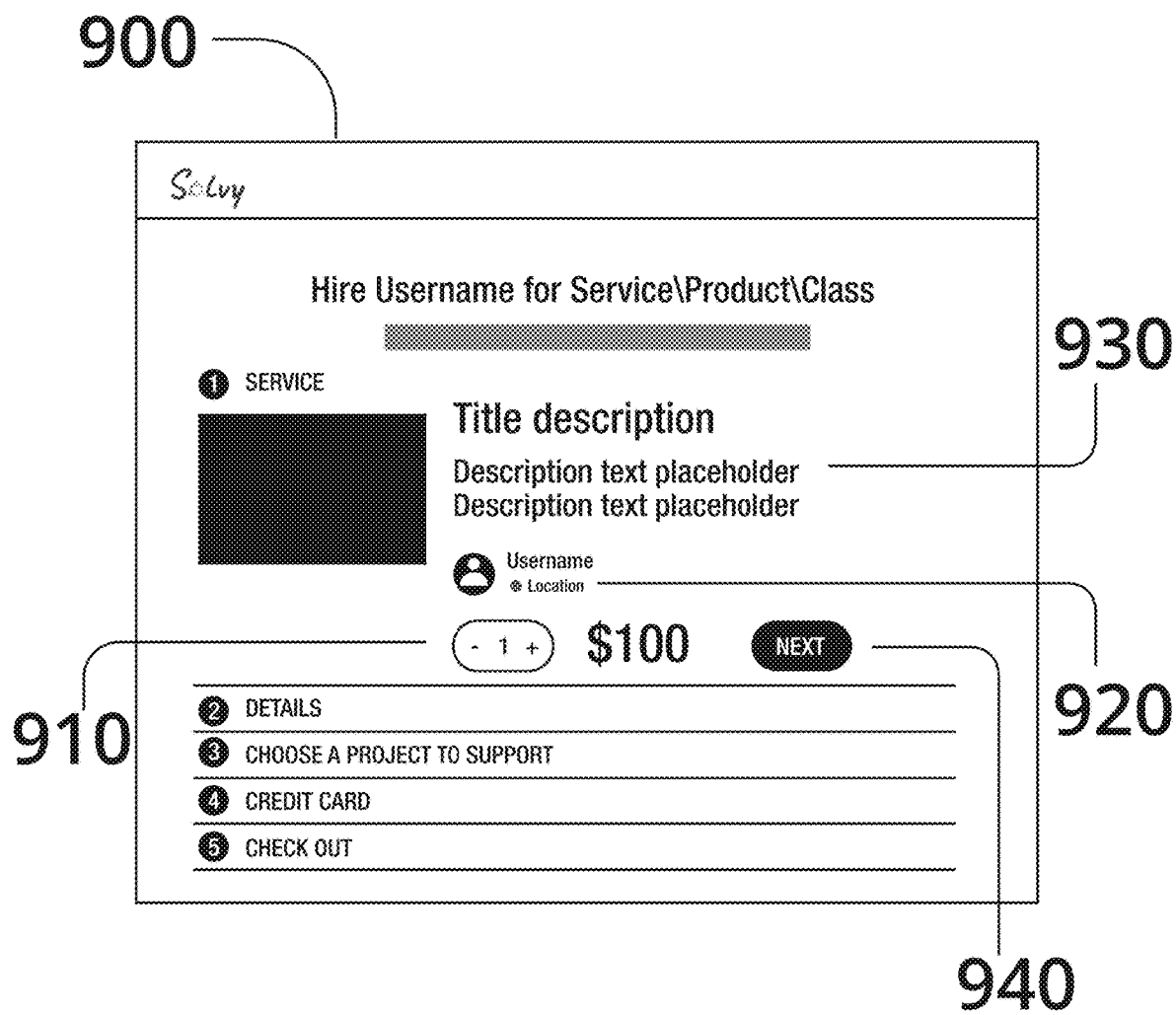
FIG. 9 shows an embodiment of an offer details input screen according to one aspect of the present disclosure.

In FIG. 8, the specific project may be selected by the shopper using dropdown control 810, then the shopper may start the hiring process by clicking hire button 820. After clicking the hire button, an offer details input screen may be displayed to the shopper. An example offer details input screen 900 is illustrated in FIG. 9, and allows the details of the offer to be input by the shopper. Offer details input screen 900 includes fields for payment details (e.g., hourly rate vs. fixed rate, dollar amount, etc.) 910, location 920 (e.g., online or the shopper may specify using an input field), and description 930. After filling in the applicable fields, the shopper may send the offer to the provider by clicking confirm button 940. The provider may then accept or decline the offer from the shopper.

In one embodiment, the shopper and the provider may also agree on payment split between the provider and the project, if the provider is unable to donate all of the time spent performing the service to the project. A minimum predefined amount, which may be defined as a fixed amount or a percentage, will always be allocated to the project.

At step 214, the provider completes the service according to the agreement between the shopper and the provider.

Figure 10:
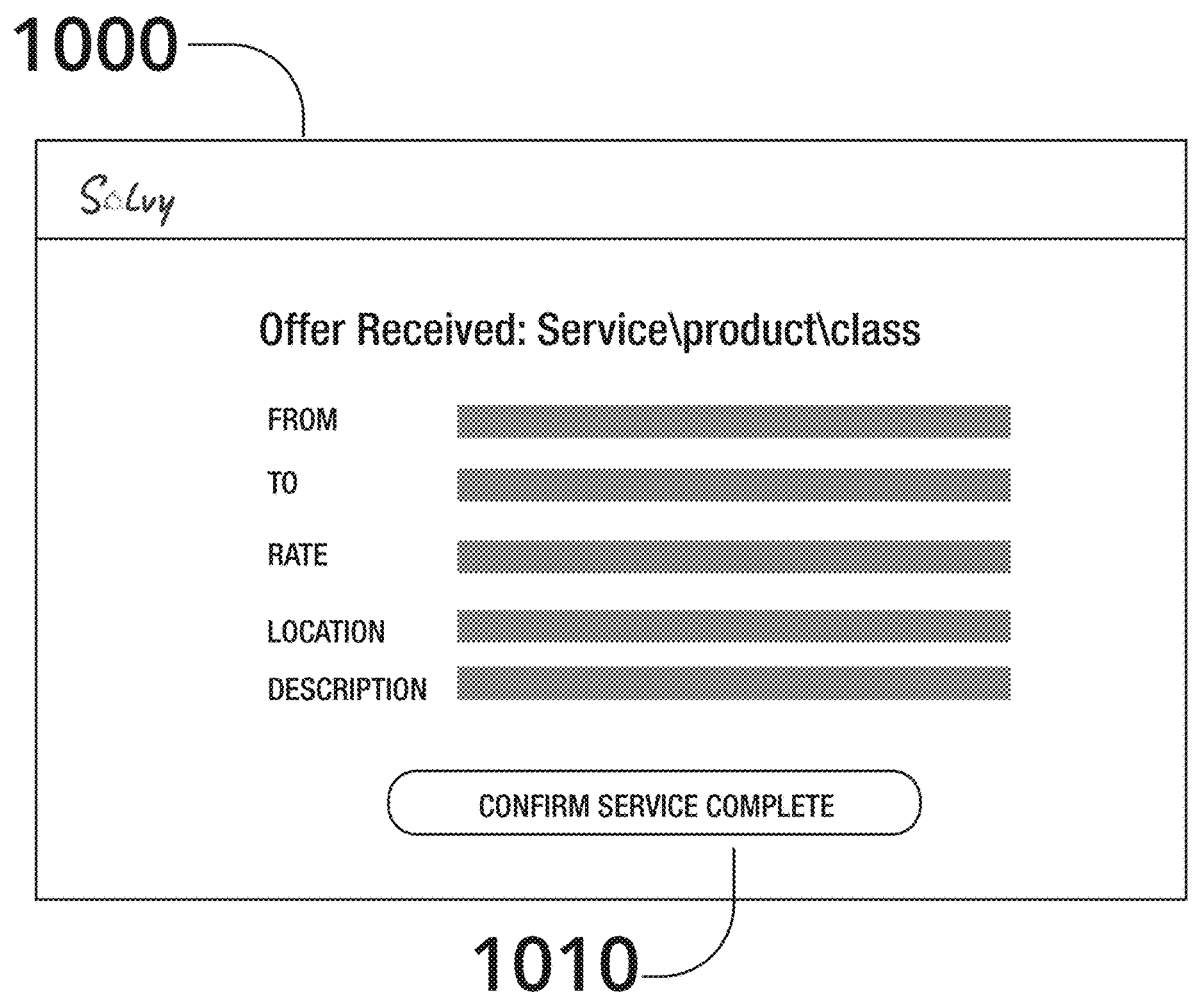
FIG. 10 shows an embodiment of an offer received screen according to one aspect of the present disclosure.

At step 216, the provider reports to the crowdfunding system that the service has been completed. For example, the provider may click the confirm service complete button 1010 on the offer received screen 1000, which is illustrated in FIG. 10. In some embodiments, the shopper may also report to the system that the service has been completed.

At step 218, the system collects the agreed amount from the shopper and deposits the agreed amount into the account related to the project, e.g., an account of the organization associated with the project manager. In situations where the provider will receive some of the funds from the shopper, that amount is deposited into the provider's account. Payment may be by government-issued currency, decentralized currency (including cryptocurrency), virtual currency, etc.

In some embodiments, the system charges a platform fee for using the system. In these embodiments, the platform fee is deducted from the amount given to the project manager and/or the provider.

At step 220, the system determines if the project has received the required funding and, if so, notifies the project manager accordingly. After the project has been funded, the project manager will then apply the funding to the completion of the project.

Figure 11:
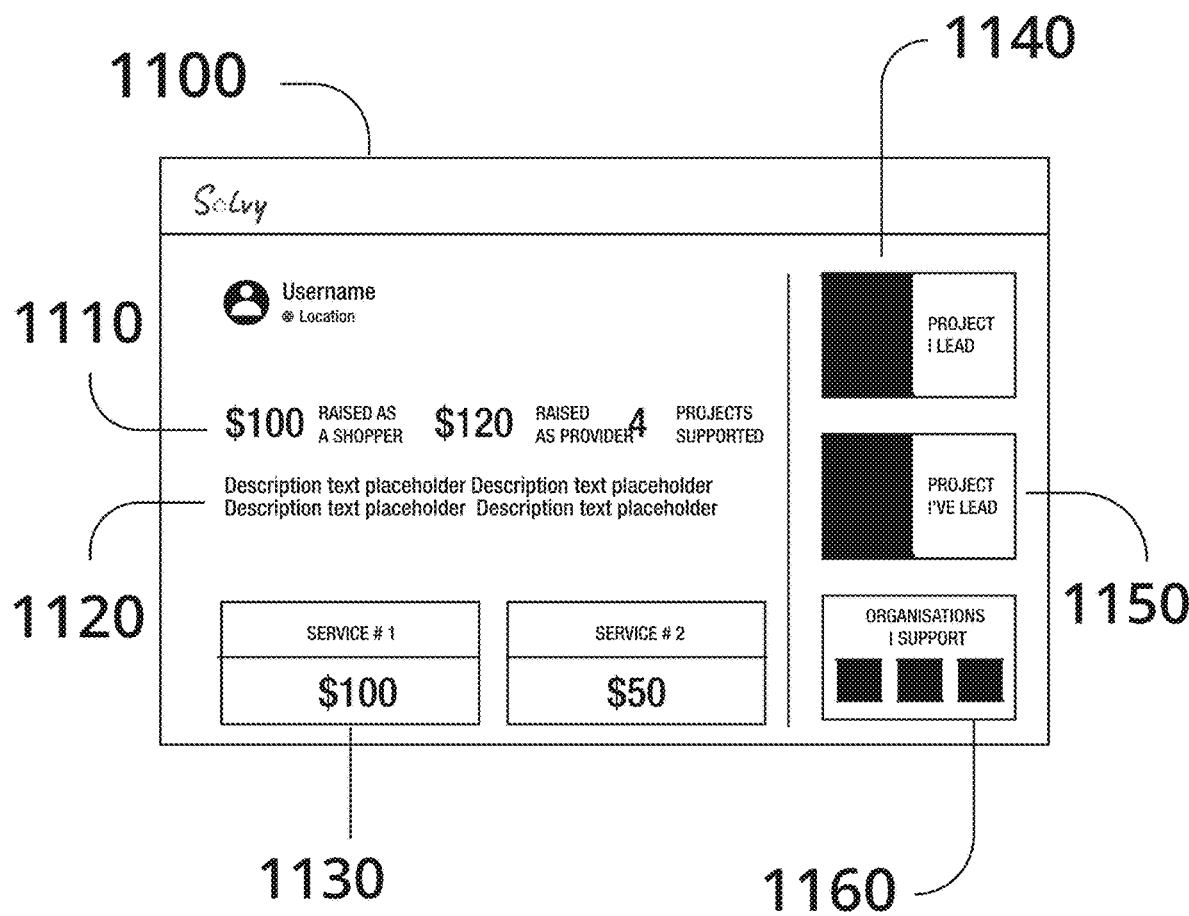
FIG. 11 shows an embodiment of a user profile screen according to one aspect of the present disclosure.

An example user profile page 1100 is illustrated in FIG. 11. The user profile page shows the amount raised by the user as both a provider and shopper, and the number of projects supported in project support section 1110; the user description 1120; a section detailing the services offered by the user 1130 (for provider users); the projects currently managed by the user 1140 (for project manager users); the projects managed in the past by the user 1150 (for project manager users); and organizations supported by the user 1160. The user profile page may also display the specific projects the user has supported both as a provider and as a shopper.

While FIG. 2 relates specifically to hiring a provider to provide a service, similar methods apply to searching for, selecting, and paying for classes, events, products, and experiences.

Figure 3:
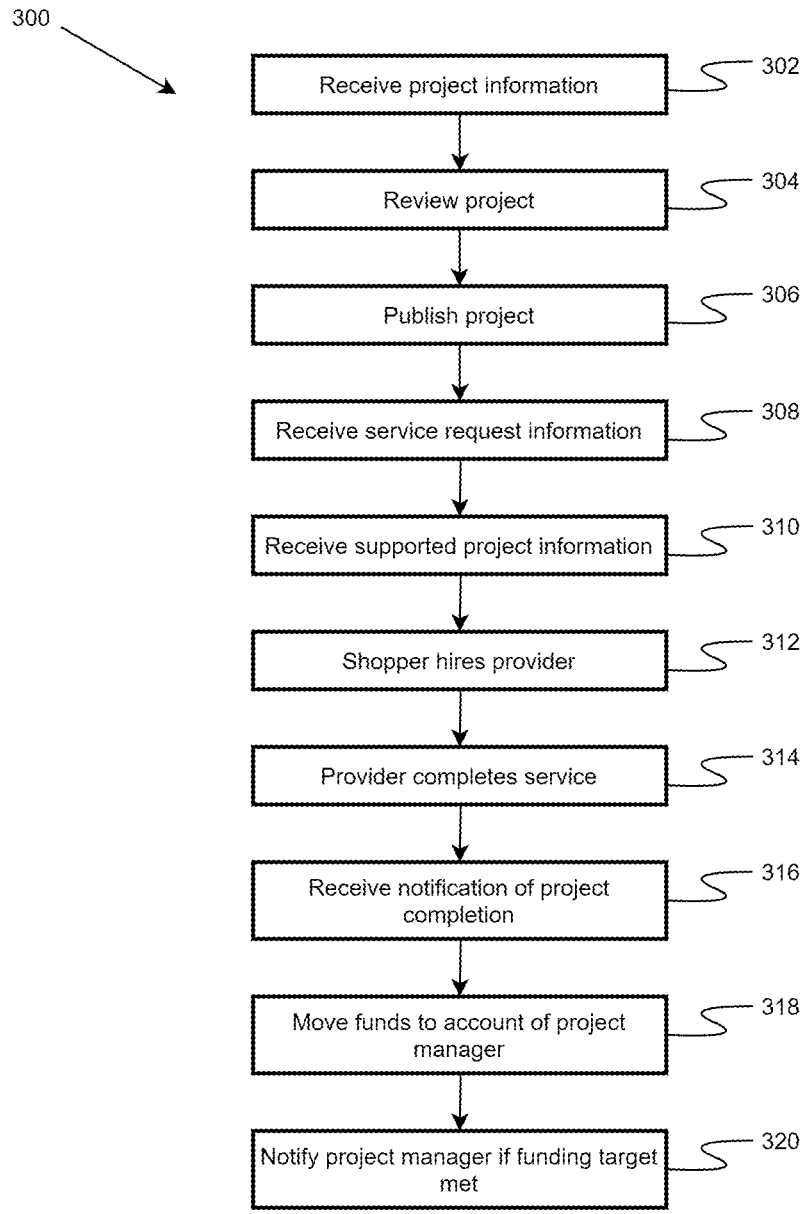
FIG. 3 shows an embodiment of a method for making a contribution to a project via a service request according to one aspect of the present disclosure.

FIG. 3 is a flow chart illustrating an alternative method 300 for receiving funding for a project, where a service request is made by a shopper, e.g., for a service that may or may not be currently offered by a provider on the system. At step 302, the crowdfunding server 130 receives information regarding a project, e.g., from a project manager, via the network 150.

At step 304, the project may be reviewed to determine if it meets the requirements of the crowdfunding system.

At step 306, the project is published to the crowdfunding system. The project may be published online through a website hosted on the server 130. The website may alternatively be hosted by a third party provider. FIG. 4 illustrates an example project information screen, and is described above with respect to step 206.

Figure 12:
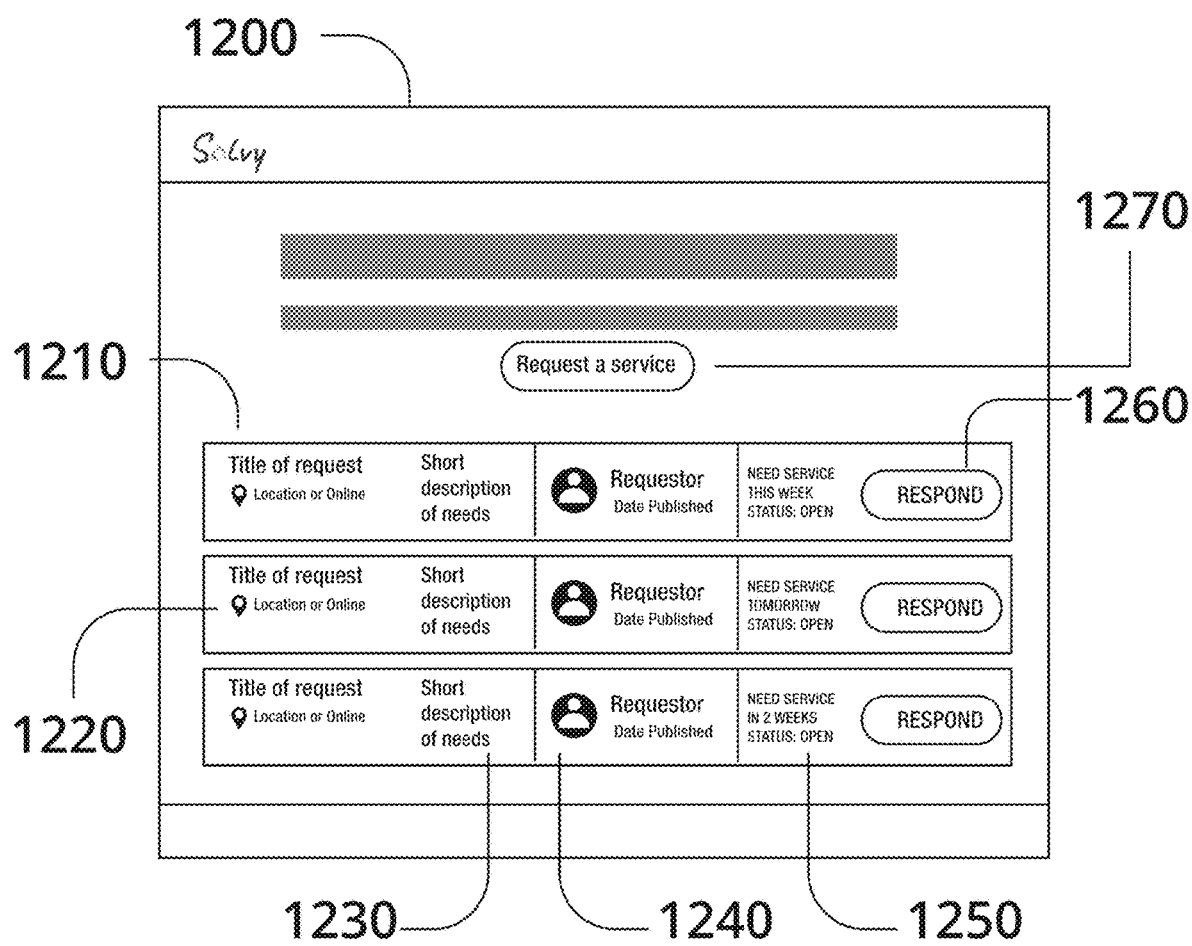
FIG. 12 shows an embodiment of a service request screen according to one aspect of the present disclosure.

At step 308, the crowdfunding system receives information regarding a service request from a shopper, e.g., by selecting request service button 1270 in FIG. 12.

At optional step 310, the crowdfunding server 130 receives information regarding one or more projects and/or categories of projects supported by the shopper. In an alternative embodiment, the shopper does not select any supported projects, allowing the provider meeting the service request to select the supported project.

At step 312, a provider that can perform the requested service views the service request and contacts the shopper, who then hires the provider. An example service request screen is illustrated in FIG. 12. Requested services are shown in service request window 1210, which included the service request title 1220, service request description 1230, requestor 1240, service request timing (e.g., when the service is needed by) 1250, and a respond button 1260 (enabling a provider who can perform the service to contact the service requestor).

During the hiring process, the project that will be supported is determined. In one embodiment, the provider and/or the shopper may unilaterally select the project that will be supported. In one embodiment, the provider may select from among the projects supported by the shopper. In one embodiment, the shopper may select from among the projects supported by the provider.

The shopper and the provider also agree on the amount that will be paid to support the project (and the amount paid to the provider, if the provider is unable to donate all of the time spent performing the service to the project). A minimum predefined amount will always be allocated to the project.

In an embodiment, email messages with service requests can be sent to providers. In this embodiment, providers can sign up to receive service requests via email. The emails can be sent in real time (e.g., as the requests are made) or at predetermined times (e.g., at 8 am each day, including all services requests received over the past 24 hours). The respond button 1260 (or similar) can be included in the email to enable communication between the requestor and the provider. Text messages, or other messaging systems, may be used instead of emails. In this embodiment, the request may be for a specific task (e.g., giving the requestor a ride to the airport), and may include the price the requestor is willing to pay. Tasks may include local tasks (e.g., ride to the airport) or online tasks, (e.g., need help editing a document).

At step 314, the provider completes the service according to the agreement between the shopper and the provider. After the service is completed, the respond button 1260 may be replaced by information about the provider who performed the service.

At step 316, the provider reports to the crowdfunding system that the service has been completed. In some embodiments, the shopper may also report to the system that the service has been completed.

At step 318, the system moves the funding amount agreed upon from the shopper's account to an account associated with the supported project. In situations where the provider will receive some of the funds from the shopper, that amount is moved from the shopper's account to the provider's account.

At step 320, the system determines if the project has received the required funding and, if so, notifies the project manager accordingly.

After the project has been funded, the project manager will then apply the funding to the completion of the project.

In some embodiments, users may want to sell products or other items and use the proceeds of the sale to support a project on the crowdfunding system. To this end, users may upload to the crowdfunding system information about products or other items they want to sell, accept offers and/or bids from other users, and effectuate the sale. The proceeds from the sale will then be applied to fund the project supported by the user selling the product. In an embodiment, the seller may support multiple projects, and the buyer will be prompted to select the project that will receive the funds from among the projects supported by the seller.

In an embodiment, a shopper user may set a funding matching goal for a project. The system then tracks donations to the project and transfers the shopper's matching funds once the donation threshold is reached.

In an embodiment, a shopper user may set a funding matching goal for an event, based on the number of tickets sold. The system tracks tickets sold and transfers the shopper's matching funds once the tickets sold threshold is reached.

In these embodiments, there may be multiple supported projects, and the matching may be limited in time, e.g., it may only be valid for a particular time period. The system tracks funds raised and transfers donor matched funds to multiple nonprofits as thresholds are reached. In an embodiment, the multiple supported projects may each be related to a particular cause.

Figure 13:
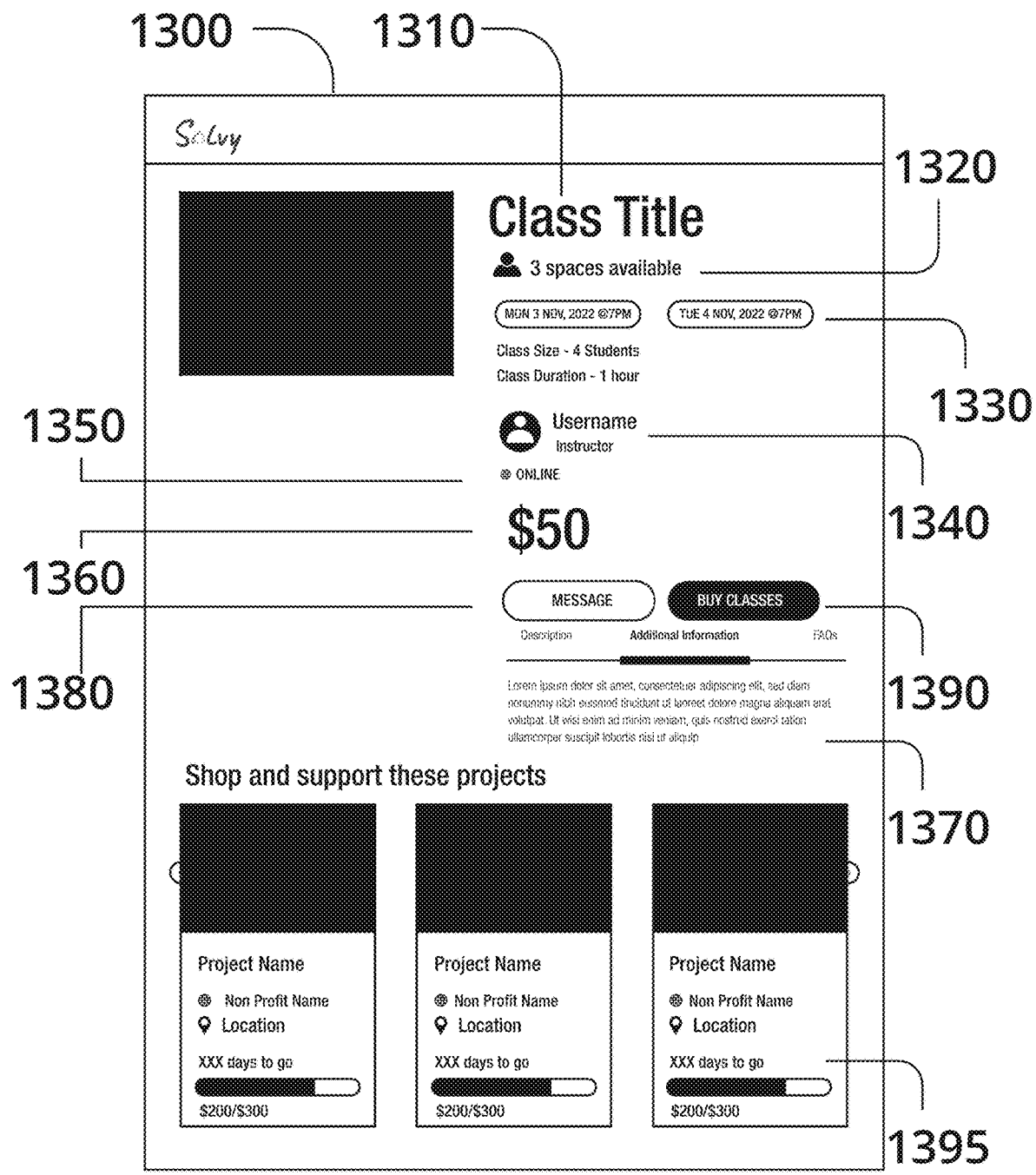
FIG. 13 shows an embodiment of a class information screen according to one aspect of the present disclosure.

An example class information screen is illustrated in FIG. 13. The class information screen includes the class name 1310, the number of spaces available 1320, the schedule of the class 1330, the class instructor 1340, the class location (including whether or not online) 1350, the cost of the class 1360, additional information about the class 1370, and action buttons 1380 and 1390, which allow the shopper to message the instructor (1380) and sign up (e.g., purchase) (1390) the class. A separate section 1395 shows projects that may be supported by signing up for the class.

Figure 14:
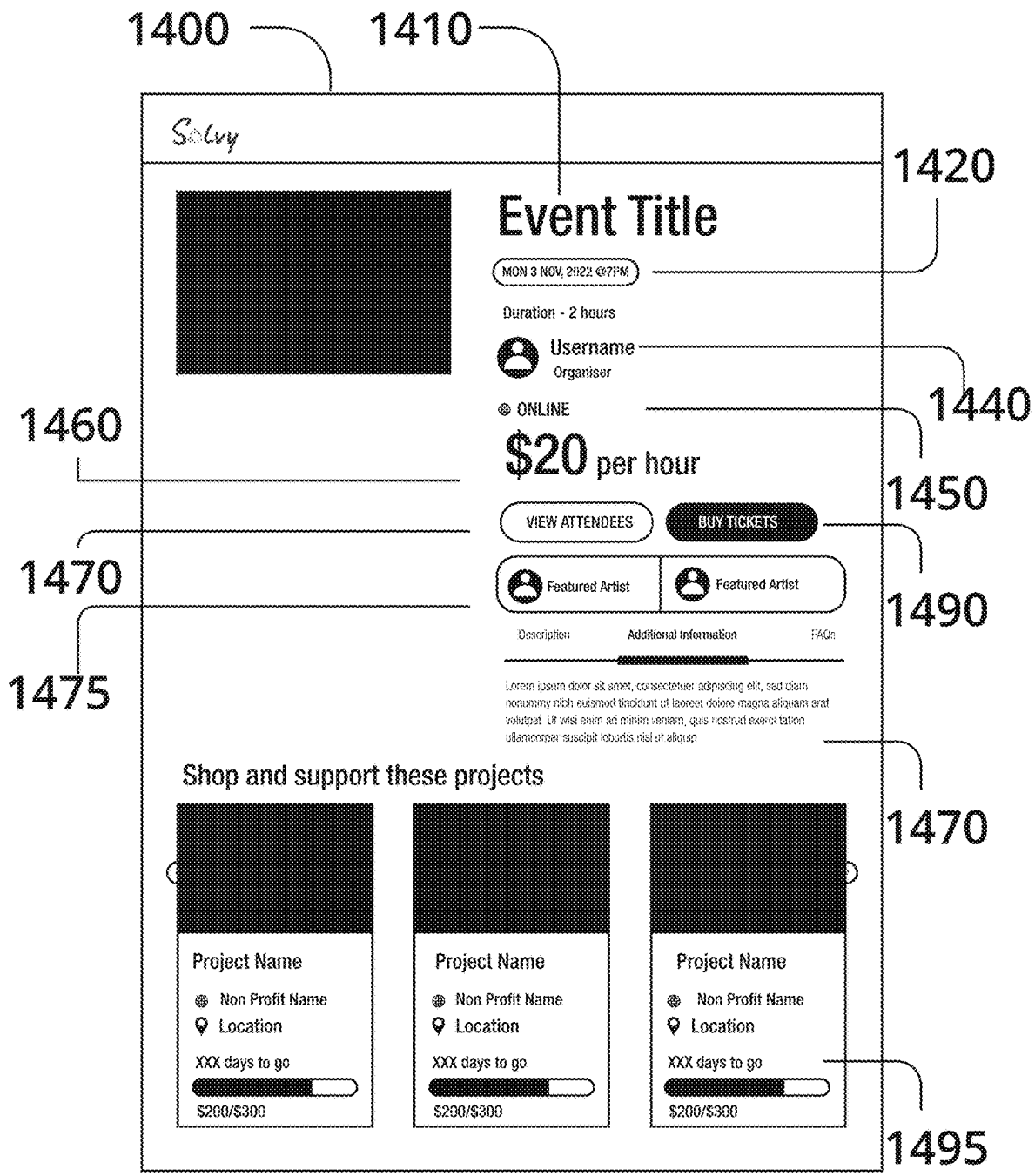
FIG. 14 shows an embodiment of an event information screen according to one aspect of the present disclosure.

An example event information screen is illustrated in FIG. 14. The class information screen includes the event name 1410, the schedule of the event (including the date, time, and duration) 1420, the event organizer 1440, the event location (including whether or not online) 1450, the cost of event tickets 1460, additional information about the event 1470, featured artists 1475, and action buttons 1480 and 1490, which allow the shopper to view event attendees (1480) and purchase tickets to the event (1490). A separate section 1495 shows projects that may be supported by attending the event.

Figure 15:
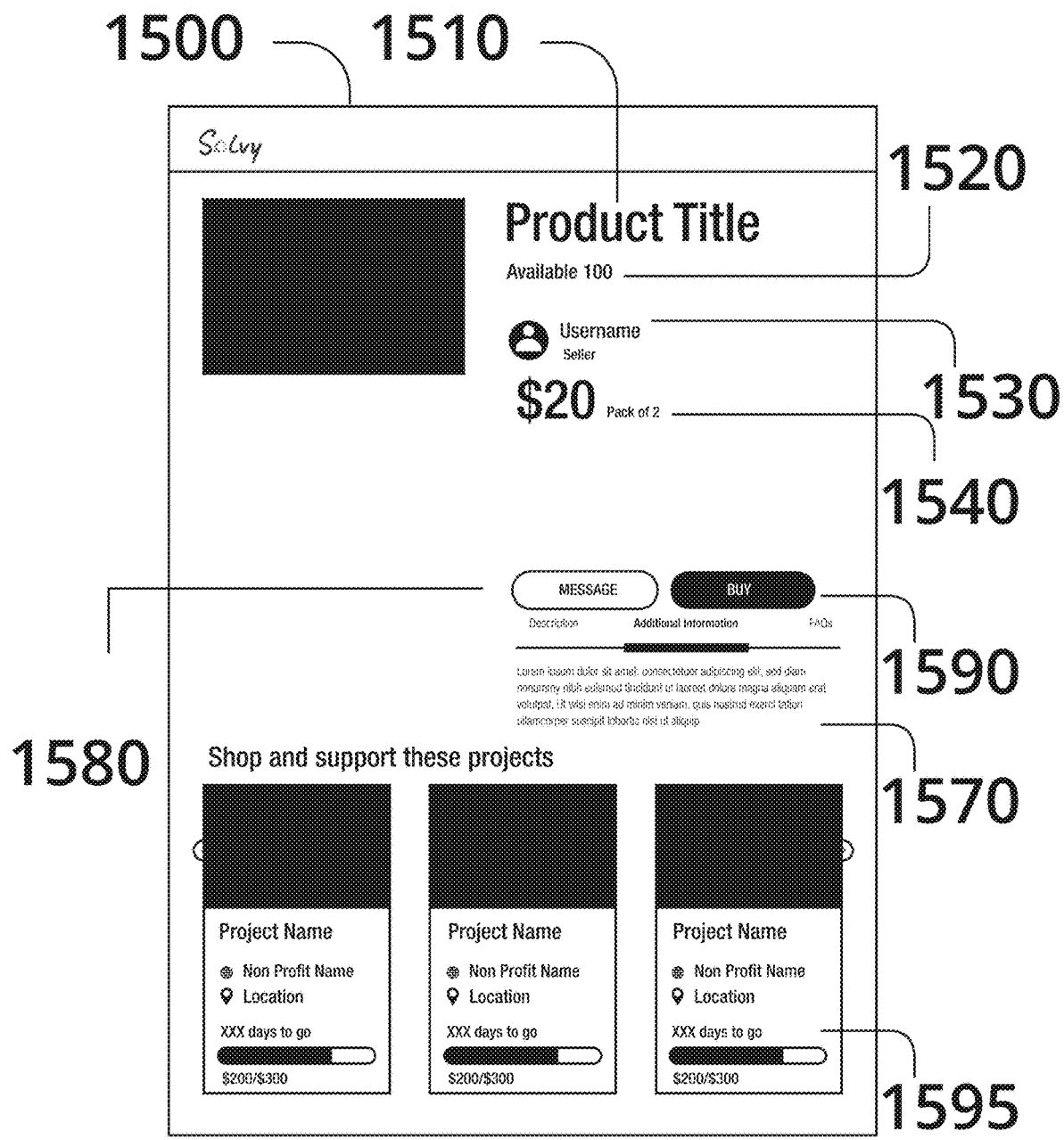
FIG. 15 shows an embodiment of a product information screen according to one aspect of the present disclosure.

An example product information screen is illustrated in FIG. 15. The product information screen includes the product name 1510, the quantity available 1520, the seller/provider 1530, the cost of the product 1540, additional information about the event 1570, and action buttons 1580 and 1590, which allow the shopper to message the seller/provider (1580) and purchase the products (1590). A separate section 1595 shows projects that may be supported by purchasing the product. Similar information screens may be presented to the user to show information about services and experiences.

Crowdfunding System API

The crowdfunding system may expose an Application Programming Interface (API) that allows other systems, devices, and application programs access to the functions of the crowdfunding system. The API defines a particular protocol for communication with the crowdfunding system.

The API can expose functions including:

Adding a new user, such as a new provider, project manager, or shopper. The parameters may include one or more of the following: user identification information (e.g., name, screen name, image, bio, etc.); user authentication information (e.g., account name, password, third-party authentication information (e.g., OAuth, Google Sign-In, Security Assertion Markup Language (SAML) Single-Sign On (SSO))); and/or contact information (e.g., email address, mailing address and/or other location information (e.g., zip code), phone number, etc.), financial information, etc.

Adding a new project. The parameters may include one or more of the following: project name, description, project categories, location, project completion date, the amount of time needed to complete the project, fundraising monetary goal, fundraising timeline, the organization supporting the project, etc.

Adding a new service. The parameters may include one or more of the following: a service description, a service category, the type of billing (e.g., hourly rate, fixed price, etc.), the rate (for hourly services) or the fixed amount (for fixed price services), the experience of the provider with respect to the offered service, the provider's availability, the provider's credentials, etc.

Adding a new class. The parameters may include one or more of the following: a class description, a category, the class location (including whether the class is online or offline), the cost of the class, the experience of the provider with respect to the class, the schedule of the class (e.g., date(s) and time(s)), maximum class size, etc.

Adding a new event. The parameters may include one or more of the following: an event description; a category; the cost of an event ticket; maximum number of tickets to be sold; event speakers, presenters, headliners, VIPs, and/or guests of honor; the date and time of the event; event organizer; other attendees; etc.

Adding a new experience. The parameters may include one or more of the following: a description; a category; the cost of the experience; the qualifications of the experience provider; the potential date(s) and time(s) when the experience can be scheduled; experience duration; etc.

Adding a new product. The parameters may include one or more of the following: a description; a category; the cost of the product; etc.

Querying for projects using provided criteria, including one or more of the following: location, % raised, cause supported, keywords, nonprofit organizing the project, project supporters or funders, etc. This API could be used by nonprofits to display their project details on their website. This API could also be used by individuals or businesses to showcase the nonprofits they support, e.g., on their websites.

Querying for services, classes, events, products, or experiences using criteria, including one or more of the following: keywords, category, cost, date and/or time, etc.

Querying for businesses supporting a project. Parameters would include at least a project ID or other identifier. Nonprofits could use this API to showcase on their website people and/or organizations that are supporting their project.

Adding to funding amount of a project. Parameters would include at least a project ID (or other identifier) and an amount to add to the funding amount.

Adding to a credit balance of a user. Parameters would include at least a user ID (or other identifier) and an amount to add to the credit balance. An additional or alternative API could be adding to a credit balance based on a code. The code would be supplied in the API call as an argument, and the crowdfunding system would apply the corresponding credit amount to the user account. The crowdfunding system would need to store the available codes and corresponding credit amounts in a database table or similar structure. Codes could be multi-use or single use.

The API may be used by any external device configured to make API requests over the internet, e.g., a user's phone with a mobile app, a web browser, a third-party server, an application plugin, etc. It enables more direct communication between the crowdfunding system and the external device, without the overhead of displaying a web interface. It also enables third-party systems, such as online shopping platforms, to allow shoppers (or other users) to purchase goods or services through the third-party platform while also allowing the shoppers to support a desired project on the crowdfunding system.

For example, an online merchant sells one or more products, event tickets, services, etc. The online merchant uses a standard shopping cart that enables a shopper to add products, tickets, services, etc., to the cart and after the shopper is finished shopping, the shopper can check out by paying for the items in the shopping cart.

In an embodiment, the online merchant also agrees to support a shopper-selected project on the crowdfunding system. The amount of support may be based on a fixed percentage of a transaction, a fixed amount for purchases over a certain threshold, etc. To enable the merchant to support the project, the merchant's online platform allows the shopper to select one or more projects in the crowdfunding sever to support as part of the transaction. For example, the shopper may be able to select a project to support directly in the shopping cart or as part of the checkout process. The online merchant's system can use the API to request a list of available projects to support, display the list to the shopper, and accept input from the shopper indicating the supported project. The merchant system can then use the API to indicate the project to be funded and the funding amount.

In an embodiment, the online merchant can allow shoppers to round their purchase to the nearest dollar, with the difference between the actual purchase price and the rounded-up amount going toward the funding goal of a project, again using the API.

In an embodiment, the crowdfunding server can implement a system of credits that can be applied to a user's account. The shopper at the online merchant's website can earn credits based on purchases, and the online merchant can use the API to add the credits to the shopper's account on the crowdfunding server. Pre-defined codes (e.g., coupon codes) could also be used to add credits to a user's account. Users can apply the credits to selected projects when logged into their accounts.

In an embodiment, the merchant system may allow the shopper to select certain types of projects during the setup process of the shopper's account, e.g., the shopper could select a specific location (e.g., metropolitan area) and type of nonprofit. The shopper could then select from projects that meet those criteria during checkout.

In an embodiment, the merchant can support a particular project upon new customer sign-up. For example, a merchant can allow a new sign-up to select a local project that will receive a pre-defined funding amount. This can help attract new customers.

In some embodiments, the merchant may show merchant-selected projects to the shopper, e.g., projects that are within a specified percentage of meeting their funding goal, projects related to a specific purpose or cause, etc.

In an embodiment, a nonprofit with an event registered in the crowdfunding system may show the event and allow the purchase of tickets to the event directly on its own website. The nonprofit website would use an API call to accomplish this.

The same or similar functionality can be incorporated into websites hosting online meetings (including one-to-one and one-to-many), creator sites, auction sites, and any other type of website where funds are exchanged. Any of these sites can use the API to display projects to customers, allow customers to select a project, and provide funding for projects.

In an embodiment, the agreement between the provider, the shopper, the crowdfunding platform, and the nonprofit can be formalized into a smart contract that is stored on a blockchain. A smart contract is a program stored on a blockchain that automatically executes when certain preconditions are met. The contract would execute when the provider has completed the service or experience, delivered the product, taught the class(es), or the event has completed. The execution of the smart contract would move the agreed upon funds from the shopper's account to the accounts of the provider, the nonprofit, and the platform.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, crowdfunding may be provided to the user via any form of sensory crowdfunding (e.g., visual crowdfunding, auditory crowdfunding, or tactile crowdfunding). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer program product encoded on one or more non-transitory computer storage media, the computer program product comprising instructions that when executed by one or more processors cause the one or more processors to perform operations comprising:
   maintaining accounts for a plurality of project managers, a plurality of providers, and a plurality of shoppers in a crowdfunding system;
   receiving information related to a project, the information including a project completion date and a funding goal;
   associating the project information with an account of a project manager of the project;
   receiving an indication that a provider supports the project;

receiving an indication that a shopper wants to hire the provider to perform a service;

receiving, via an application programming interface defining a protocol for communication with the crowdfunding system, an indication that the service has been performed;

transferring an agreed monetary amount from an account of the shopper to an account related to the project, the transferred monetary amount being added to a funding amount related to the project; and notifying the project manager when the funding amount equals or exceeds the funding goal;

wherein after the project is funded, the project manager uses the funding to staff and complete the project;

wherein the application programming interface exposes functions including adding a new service, adding a new project, adding a new event, querying for projects, querying for services, querying for events, querying for businesses supporting a project, and adding to the funding amount for a project.

2. The computer program product of claim 1, wherein the service comprises a class.

3. The computer program product of claim 1, wherein the service comprises an experience.

4. The computer program product of claim 1, wherein the service comprises an event.

5. The computer program product of claim 1, wherein the operations further comprise reviewing the project to determine if the project meets one or more requirements of the system.

6. The computer program product of claim 1, wherein the operations further comprise receiving an indication that the shopper supports the project.

7. The computer program product of claim 1, wherein the project is associated with an organization.

8. The computer program product of claim 1, wherein the operations further comprise transferring an agreed monetary amount from an account of the shopper to an account of the provider.

9. The computer program product of claim 1, wherein the operations further comprise transmitting information related to the project to a user device for display to the provider, wherein the transmission is based on matching the information related to the project with information related to past projects supported by the provider using a machine learning technique.

10. The computer program product of claim 1, wherein the operations further comprise transmitting information related to the project to a user device for display to the shopper, wherein the transmission is based on matching the information related to the project with information related to past projects supported by the shopper using a machine learning technique.

11. A method for raising funds for a project, the method comprising:

maintaining accounts for a plurality of project managers, a plurality of providers, and a plurality of shoppers in a crowdfunding system;

receiving information related to a project, the information including a project completion date and a funding goal;

associating the project information with an account of a project manager of the project;

transmitting a subset of the received information related to the project to a user application for display to a shopper in connection with a service provided by a provider;

receiving, via an application programming interface defining a protocol for communication between the crowdfunding system and the user application, an indication that the service has been performed;

transferring an agreed monetary amount from an account of the shopper to an account related to the project, the transferred monetary amount being added to a funding amount related to the project; and notifying the project manager when the funding amount equals or exceeds the funding goal;

wherein after the project is funded, the project manager uses the funding to staff and complete the project;

wherein the application programming interface exposes functions including adding a new service, adding a new project, adding a new event, querying for projects, querying for services, querying for events, querying for businesses supporting a project, and adding to the funding amount for a project.

12. The method of claim 11, wherein the service comprises a class.

13. The method of claim 11, wherein the service comprises an experience.

14. The method of claim 11, wherein the service comprises an event.

15. The method of claim 11, further comprising reviewing the project to determine if the project meets one or more requirements of the system.

16. The method of claim 11, further comprising receiving an indication that the shopper supports the project.

17. The method of claim 11, wherein the project is associated with an organization.

18. The method of claim 11, further comprising transferring an agreed monetary amount from an account of the shopper to an account of the provider.

19. The method of claim 11, further comprising transmitting information related to the project to a user device for display to the provider, wherein the transmission is based on matching the information related to the project with information related to past projects supported by the provider using a machine learning technique.

20. The method of claim 11, further comprising transmitting information related to the project to a user device for display to the shopper, wherein the transmission is based on matching the information related to the project with information related to past projects supported by the shopper using a machine learning technique.

\* \* \* \* \*